Dec. 2, 1958 R. G. HARTFIELD ET AL 2,863,047

RADIO RECEIVER

Filed July 22, 1955 2 Sheets-Sheet 1

INVENTORS
Robert G. Hartfield
Alfred J. Clark
BY Mueller & Aichele
Attys.

INVENTORS
Robert G. Hartfield
BY Alfred J. Clark
Mueller & Aichele
Attys.

United States Patent Office 2,863,047

Patented Dec. 2, 1958

2,863,047

RADIO RECEIVER

Robert G. Hartfield, Berwyn, and Alfred J. Clark, Palatine, Ill., assignors to Motorola, Inc., Chicago, Ill., a corporation of Illinois Application July 22, 1955, Serial No. 523,745

8 Claims. (Cl. 250—20)

This invention relates to tuning systems for radio receivers and more particularly to such systems which are arranged to tune receivers to stations automatically by means of a signal seeking arrangement.

One of the more common uses of signal seeking, or stop-on carrier tuning systems is in automobile radios. It is obviously a convenience for a person in an auto to operate a switch or the like so that the receiver scans across a band of frequencies and automatically tunes to a received carrier wave. The usual practice is for a user to set the mechanism in operation repeatedly until it has tuned a station to which he desires to listen. This generally involves successive momentary operations of a switch which causes energization of a motor to drive the radio tuning apparatus and which also causes energization of a control circuit for stopping the motor each time a station has been selected. Therefore, the user of the apparatus, who may be otherwise occupied with driving, may select a desired radio program in a minimum of time and with a minimum of attention.

However, it may be seen that an automobile may sometimes be in an urban area where there could be received several local stations with relatively high strength as well as some stations of comparatively low strength from more remote locations. In such a situation the user of the receiver may desire to choose among only the local or high strength stations for his enjoyment of familiar programs and/or better received signals. It should also be apparent that if the automobile is in a rural area or in a section where there are few stations received at high strength, the user would very likely wish to choose among all of the received signals including those of comparatively low strength. Thus there is indicated a need for signal seeking apparatus which permits general scanning of virtually all received signals as well as a more restricted scanning of only signals of high strength.

It is an object of this invention to provide simple automatic stop-on carrier tuning apparatus permitting choice of the strengths of the carriers on which the apparatus stops, thus being adapted especially for operation in areas where strong carrier waves are present and in areas where only weak carrier waves exist.

Another object is to provide an improved signal seeking tuning apparatus wherein operation of one control renders the system responsive to substantially all received signals and operation of a second control renders the system responsive to only relatively strong signals.

A feature of the invention is the provision of improved signal seeking tuning apparatus including a dual section switch, operation of either section of which energizes a scanning motor and renders operative a control circuit to stop the motor when a station is properly tuned. The switch includes a further portion operated by the separate sections to selectively control the sensitivity of the tuning circuit so that signals of both low and high level may operate the control circuit, or so that only high level signals may operate the circuit.

A further feature of the invention is the provision of a signal tuning system for a receiver which includes a control circuit having a relay with contacts for providing an intermediate bias on amplifier tubes of the receiver when the relay is released and a signal is tuned and further contacts to establish increased or decreased bias on the tubes according to which section of a dual section switch is operated for signal seeking at high and low sensitivity when the relay is energized.

Further objects, features and the attending advantages of the invention will be apparent upon consideration of the following description when taken in conjunction with the accompanying drawings in which.

In accordance with this invention signal seeking tuning apparatus for a radio receiver is provided which may, through choice of the operator, be responsive to tune automatically received signals of both high and low strength received by the radio receiver, or to tune automatically received signals of a selected comparatively high strength. The apparatus includes a switch having first and second sections each adapted to be momentarily closed to operate a relay device which has contacts for energizing a driving mechanism or motor to tune the receiver through a frequency band and to energize a control circuit which is responsive to a received signal to release the relay device and stop the driving mechanism when a station is tuned. An additional portion of the switch which is operated by the first switch section and remains operated when that section is released after starting the automatic driving mechanism, and which is opened when the second section is operated, is used to control the sensitivity of the tuner control circuit. This switch portion establishes through a contact of the relay device a comparatively high gain circuit in amplifier stages of the receiver so that received signals of substantially all levels will be translated in the receiver to operate the control circuit. When the additional portion of the switch is released, however, by operation of the second section of the switch, the receiver amplifier stages operate at lesser gain so that only signals of high level may reach the control circuit to cause automatic tuning in the receiver. The gain of the receiver amplifier stages may be controlled by control of the bias applied thereto. The relay device may have a further contact which establishes the gain of the receiver at an intermediate point when the device is released and a station has been selected so that automatic tuning may be had with the receiver at high or low gains and actual listening may be enjoyed with the receiver at an intermediate or normal gain.

Figures 1, 2:
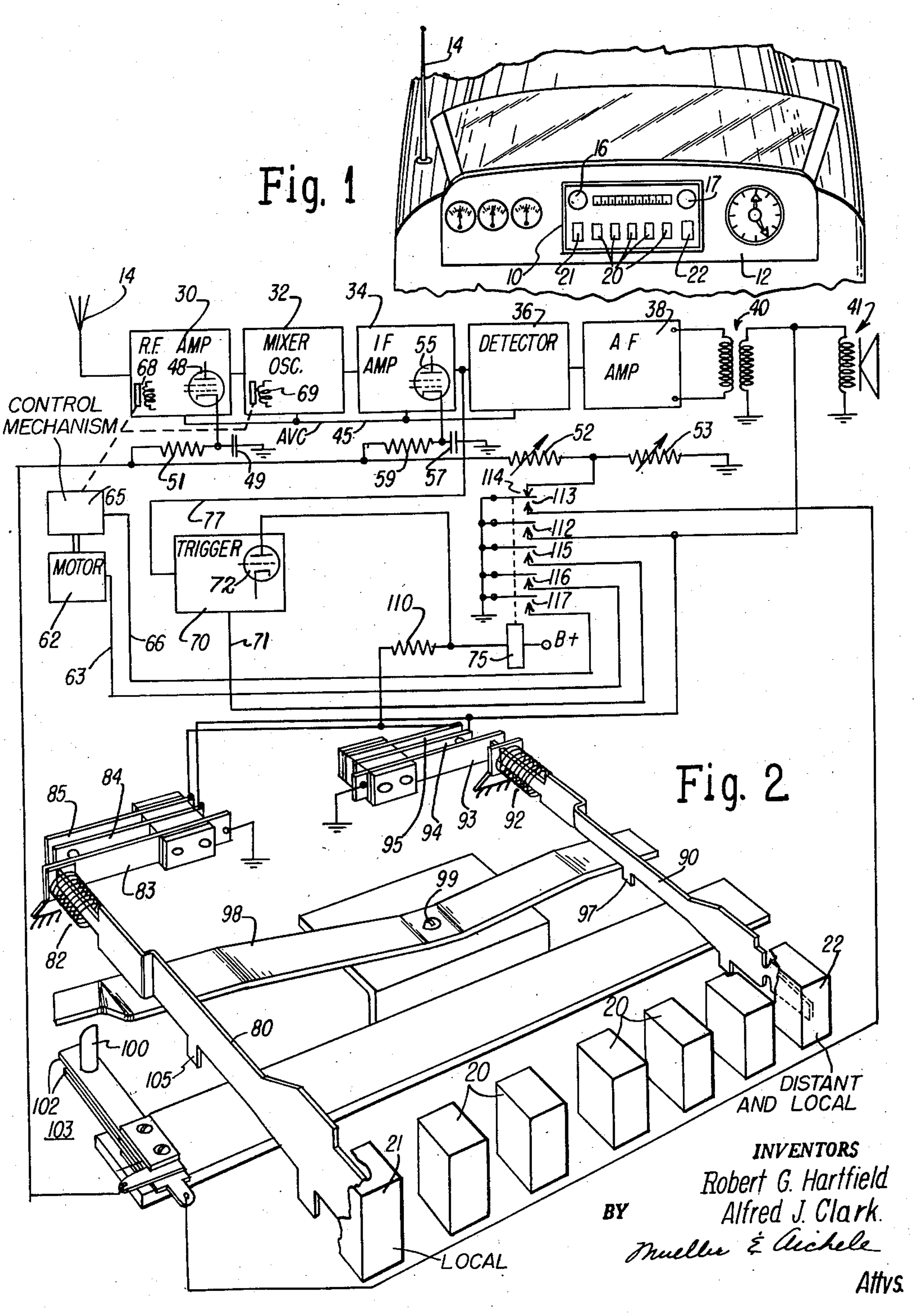
Fig. 1 illustrates an automobile radio receiver which may incorporate the invention.
Fig. 2 illustrates the invention in diagrammatic form.

Fig. 1 illustrates a radio receiver 10 mounted on the automobile dashboard 12 in any convenient manner. Antenna 14 is suitably connected to the receiver 10 to supply signals thereto. The receiver includes the usual tuning and volume controls 17, 16 respectively, and station selecting buttons 20 each of which may be used to select a single predetermined station as is familiar to those in the art. Push buttons 21 and 22 are utilized in the signal seeking operation which will be explained in greater detail in connection with Fig. 2.

The circuit of Fig. 2 shows receiver 10 in which signals from antenna 14 are applied to the radio frequency amplifier 30 which selects and amplifies them and applies the same to the mixer oscillator circuit 32. Circuit 32 heterodynes the received signal to effect conversion to an intermediate frequency. The intermediate frequency is then applied to I. F. amplifier 34 for further amplification after which it is demodulated in the detector circuit 36 and coupled to the audio frequency amplifier 38. Output transformer 40 then applies the audio signal to loudspeaker 41 from the amplifier circuit 38. The operation of the receiver 10 as described thus far is familiar to those in the art and may be seen to be that of a known superheterodyne type. Automatic volume control may be provided in the receiver in the usual manner and applied over line 45 to R. F. amplifier 30 and the mixer oscillator circuit 32.

The electron valve 48 in the R. F. amplifier 30 has a cathode which is bypassed to ground through capacitor 49 and which includes a direct current path to ground through resistors 51, 52 and 53. It may also be seen that electron valve 55 in the I. F. amplifier 34 includes a cathode bypassed to ground by means of capacitor 57 and having a D. C. path to ground through resistors 59, 52, and 53. In accordance with well understood principles of cathode biasing, the amount of the D. C. resistance in the cathode circuit of either of these valves determines the amplification thereof and thereby regulates the sensitivity of the receiver.

The apparatus further includes the driving mechanism for the tuning apparatus of a receiver in the form of a motor 62 which is energized by applying ground to lead 63 and a control mechanism 65 which is operative by applying ground to lead 66 to mechanically connect the motor to tuning circuit elements 68 and 69 in the circuits 30 and 32, respectively. Thus when lines 63 and 66 are grounded, the receiver will be tuned through a frequency band and will stop or remain tuned to a particular frequency when ground is removed from these lines.

The system also incorporates a trigger circuit 70 which is rendered operative by applying ground to line 71 and which includes an electron valve 72 having an anode circuit coupled to B+ through the winding of relay 75. Accordingly when valve 72 is conducting, the relay 75 is energized. The trigger circuit 70 has an input connection 77 from the output of I. F. amplifier 34 which applies a control related to the received and amplified signal from the receiver proper to circuit 70. Such a control may be a potential derived from the rectified received signal. It is contemplated that when the received signal and thus the control, reaches a certain level, trigger circuit 70 will be disabled and electron valve 72 will be cut off to cause de-energization of relay 75 even though line 71 is grounded.

Turning now to the switch mechanism, it may be seen that operation of push button 21 will move plunger rod 80 inwardly against spring 82 thereby moving grounded contact 83 first into engagement with contact 84 and then into engagement with contact 85. Upon release of button 21 plunger rod 80 will return to an outward position due to the biasing of spring 82 and the interconnection of contacts 83, 84 and 85 will be broken. Similar operation obtains with inward movement of pushbutton 22 which operates plunger rod 90 against spring 92, thus bringing grounded contact 93 into electrical engagement with contact 94 and then contact 95. It may also be seen that as plunger rod 90 moves inwardly, the lug portion 97 may engage the switch actuator arm 98 to pivot this arm about the point 99 so that the opposite end of the arm moves upon peg 100 to close contacts 102 of the switch 103. It should be pointed out that switch arm 98 would remain in its pivoted position of engagement with peg 100 after plunger rod 90 has returned to its outward position and that opening of contacts 102 may only be effected by movement of plunger rod 80 to bring lug portion 105 into engagement with the opposite side of switch arm 98 thus moving the arm out of engagement with peg 100.

To complete the description of the circuit it may be observed that contacts 85 and 95 are coupled together and through resistor 110 to the anode of electron valve 72. Contacts 84 and 94 are also coupled together and to contacts 112 of relay 75. The contacts of switch 103 are connected between the junction of resistors 51 and 52 and contact 113 of relay 75. It may also be seen that contacts 114 of relay 75 which are established in the de-energized condition of this relay are connected between ground and the junction of resistors 52, 53. The remaining contacts 115, 116 and 117 of relay 75 are respectively connected to lines 71, 63 and 66. As is apparent in the energized condition of relay 75, the contacts 112, 113 and 115—117 are all connected to ground and contacts 114 are opened. It should also be pointed out that one side of the secondary of output transformer 40 and one side of the voice coil of speaker 41 are grounded and that the other sides of these respective windings are connected together and to contacts 112 of relay 75 in order to establish a muting arrangement for the receiving system when contacts 112 are closed.

Considering now the operation of the system it may be seen that pressing push button 21 will first cause grounding of contact 84 thus silencing loud speaker 41 by short circuiting its voice coil. Further inward movement of plunger rod 80 causes opening of switch 103 and grounding of contact 85 to complete an energizing circuit for relay 75 through current limiting resistor 110, thus closing contacts 112, 113 and 115—117 of this relay. As previously mentioned, once ground has been applied to line 71, electron valve 72 will conduct and thus maintain relay 75 energized. The circuit is therefore held even though the operator releases push button 21, and spring 82 causes return of plunger rod 80 allowing contacts 84 and 85 to open. It may also be seen that short circuiting of loud speaker 41 is maintained through contacts 112 and that motor 62 and mechanism 65 is operative because contacts 116 and 117 are closed. Accordingly, the receiver is tuned through a band of frequencies as motor 62 mechanically drives circuit elements 68, 69.

With relay 75 energized and contacts 114 open, the cathode bias for electron valve 48 is provided by resistors 51, 52 and 53. Similarly, the cathode bias for electron valve 55 is provided by resistors 59, 52 and 53. Thus the gain or sensitivity of the receiver is reduced over that obtaining when contacts 114 are closed and resistor 53 is shorted. The actual reduction in sensitivity when contacts 114 are open may be adjusted by variation of the resistor 53, so that only received signals of a relatively high level may be translated by the receiver through stages 30, 32 and 34 to be applied as a control via line 77 to the trigger circuit 70 at a level sufficient to cause operation of this circuit and cut-off of electron valve 72. Therefore, the scanning of the frequency band will continue until a signal of relatively high strength is tuned in, at which time relay 75 will be de-energized, thus stopping motor 62, opening mechanism 65, and unshorting loudspeaker 41 and at the same time closing contacts 114, so that the receiver sensitivity will be increased to what may be termed a normal level used for listening to the received program. However, it may be seen that the sensitivity of the receiver will be subject to automatic volume control over line 45 while ordinary volume control may be provided by any suitable means incorporated in the audio frequency amplifier 38.

It is apparent that by variation of resistor 52 an adjustment may be made in the so-called normal sensitivity, so that it is of the proper value to be subject to further effective control by the AVC circuit. Thus by operation of push button 21 the receiver will be responsive to local signals or those of relatively high strength for automatic tuning purposes. Of course it is understood that an operator may operate button 21 repeatedly until the receiver has finally tuned a relatively strong station to which he desires to listen.

Assuming now that operator would desire to automatically tune substantially all stations translated by the receiver, he would operate push button 22. As previously mentioned, this would make the automatic apparatus responsive to signals of comparatively low strength as well as signals of comparatively high strength. Inward movement of plunger rod 90 would first close contacts 94 and mute the loud speaker 41 and would then close contacts 95 to energize relay 75. Accordingly, motor 62, mechanism 65 and trigger circuit 70 would again be responsive since contacts 115—117 are closed. However, as contacts 95 are closed, lug portion 97 would engage arm 98 to pivot same about point 99 and cause closing of switch 103. With relay 75 energized and thus contacts 113 closed, the operation of switch 103 and closing of contacts 102 will apply ground to the junction of resistors 51, 59 and 52. Accordingly, the cathode bias resistor for valve 48 consists only of resistor 51 and the cathode bias arrangement for valve 55 consists only of resistor 59. Therefore, the gain or sensitivity of these stages 30 and 34 will be increased and even signals of rather low strength may cause operation of the trigger circuit 70 and release of relay 75. Thus an operator may repeatedly operate button 22 until a desired program has been tuned.

It may be noted that switch 103 will remain closed, as button 22 is released by the pressing of spring 92 so that on repeated operations of this button, switch 103 will already be closed. Of course, when a station has been selected and relay 75 is de-energized, contacts 113 open, so that the fact that switch 103 is in operative condition will have no effect on the operation of the receiver. It is obvious, of course, that, when push button 21 is operated, switch 103 will be released and will remain released through any repeated operations of button 21.

Figure 3:
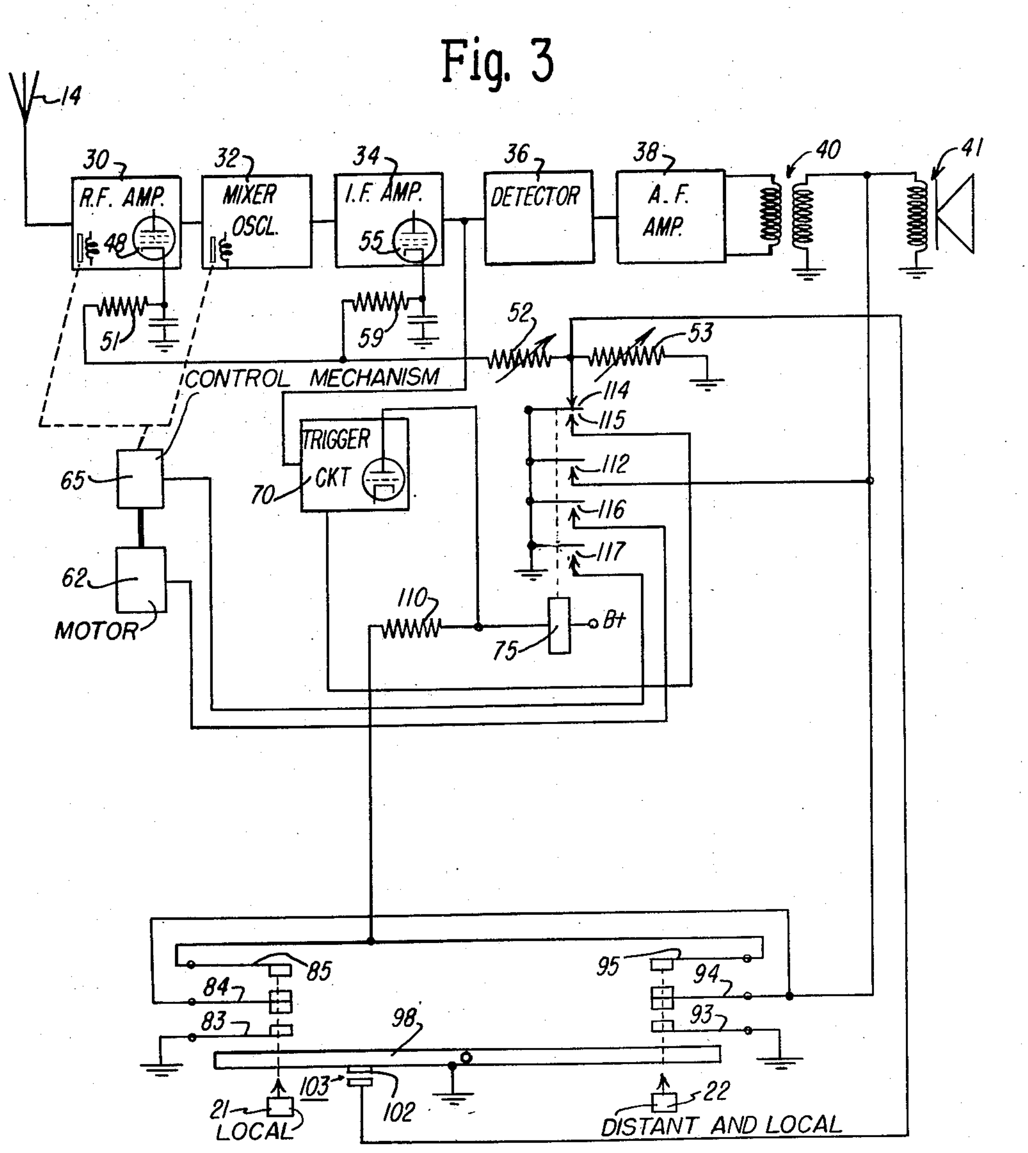
Fig. 3 illustrates a modified form of the invention.

In the modification shown in Fig. 3 the components corresponding to those of Fig. 2 are given the same reference numerals. In this form of the system, it may be noted that contacts 102 of switch 103 are coupled between ground and the interconnection of resistors 52 and 53. Contacts 113 of relay 75 series coupled with switch 103 in Fig. 2 are not necessary and in their stead contacts 115 which control the trigger circuit 70 are utilized. The switch mechanism may be similar to that shown in Fig. 2 and is therefore shown schematically in Fig. 3 for simplification.

By operation of button 21 the mechanism will be set in operation in a manner entirely similar to that described above. However, when button 22 is operated for signal seeking of both high and low strength signals, contacts 102 will be closed thus shorting variable resistor 53 so that signal seeking takes place at the same gain of the receiver which is provided for normal reception. That is, the cathode bias for valve 48 consists of resistors 51 and 52 while the cathode bias for valve 55 consists of resistors 59 and 52. Accordingly the sensitivity of the receiver is not increased beyond that used for the normal listening in signal seeking of stations of high and low levels in the form of the invention shown in Fig. 3. However, reduction in the gain of the receiver is made in the same manner as in the circuit of Fig. 2 when signal seeking of only high strength signals is desired, that is, by the addition of the bias provided by resistor 53 to the valves 48 and 55 to reduce the gain thereof. The circuit of Fig. 3 has the advantage of requiring one less contact on relay 75 and permitting the grounding of one terminal of switch 103.

This invention provides, therefore, simplified signal seeking apparatus which permits a choice of the strengths of signals searched or scanned by the automatic mechanism. Operation of push button 22 may be considered most appropriate in rural or remote areas where tuning of relatively weak signals may be necessary. Operation of push button 21 may be considered most appropriate for urban areas where a desired signal will usually be received at relatively high level and one would generally not care to have the receiver tune automatically all the signals received. Through the simple mechanism and circuitry thus provided, the gain or sensitivity of the radio receiver is automatically adjusted to a condition of high sensitivity or decreased sensitivity, according to the type of signal seeking desired. Therefore, the system may contribute to improved operation of the triggering circuit 70, since in most instances signals of high strength will be searched or automatically tuned at relatively low receiver sensitivity and signals of low strength will be tuned at high receiver sensitivity and the trigger circuit will be operated by a control of more uniform input. With the trigger circuit being operated at a more constant input level, it is possible to improve the stop-on signal characteristics of the motor and associated mechanism to permit automatic tuning of greater accuracy.

We claim:

1. In a wave signal receiver having variable tuning apparatus adapted to select stations and having high amplification and sensitivity in response to a control applied thereto and low amplification and sensitivity in the absence of such control, the tuning system of such a receiver for automatically selecting signals of high and low strength and selecting signals of only high strength, including in combination, driving means adapted to operate the tuning apparatus so that the same tunes across a frequency band, a control circuit adapted to deenergize said driving means and stop the tuning apparatus on application of a signal above a predetermined level thereto from the receiver, switching means including first and second separately operative sections each having portions adapted to render said control circuit operative immediately and to energize said driving means on operation of such portions, said second section including a further operative portion interlocked to be released by operation of said first section and having a single pair of contacts adapted to be closed to apply the control to the receiver so that the same has high sensitivity and signals of high and low strength in said frequency band are applied to said control circuit above the predetermined level to deenergize said driving means, and so that only a signal of high strength is applied to said control circuit above said predetermined level when said first section is operated and said second section is released.

2. In a wave signal receiver having variable tuning apparatus adapted to select stations and having high amplification and sensitivity in response to a control applied thereto and low amplification and sensitivity in the absence of such control, the signal seeking apparatus operative in one mode for selecting signals of various strengths and in another mode for selecting only signals of comparatively high strength, including in combination driving means adapted to operate the tuning apparatus so that the same tunes across a frequency band, switching means including first and second individually operative sections, said second section including an additional portion releasable by operation of said first section, a control circuit responsive to a signal of predetermined level in the receiver to become inoperative, relay means having contacts to operate said driving means and said control circuit and to apply the control to the receiver through said additional portion of said second of said switching means, said control circuit including means for deenergizing said relay means when said control circuit is inoperative, and said first and second switch sections having contacts coupled to said relay means for initially energizing the same so that operation of said second section of said switching means establishes an operative mode where signals of various strengths are applied to said control circuit at the predetermined level and operation of said first section establishes an operative mode where only signals of comparatively high strength are applied to said control circuit at the predetermined level.

3. In a wave signal receiver having variable tuning apparatus adapted to select stations and having high and medium amplification and sensitivity respectively in response to first and second controls applied thereto, and having low amplification and sensitivity in the absence of the first and second controls, the signal seeking apparatus operative in one mode for selecting signals of various strengths and in another mode for selecting only signals of high strength, including in combination driving means adapted to operate the tuning apparatus so that the same tunes across a frequency band, switching means including first and second individually operative sections, said second section including an additional switch portion operable by said second section and releasable only by operation of said first section, a control circuit responsive to a signal of predetermined level in the receiver to become inoperative, relay means having contacts to operate said driving means and said control circuit, said relay means having further contacts to apply the first control to the receiver through said additional switch portion in operated condition, to remove the first and second controls in released condition of said additional switch portion, and to apply the second control to the receiver in the deenergized condition of said relay means, said control circuit including means for deenergizing said relay means when said control circuit is inoperative, and said first and second switch sections having contacts coupled to said relay means for initially energizing the same so that operation of said second section of said switching means establishes an operative mode where signals of various strengths are applied to said control circuit at the predetermined level and operation of said first section causes an operative mode where only signals of high strength are applied to said control circuit at the predetermined level and deenergization of said relay means establishes operation of said wave signal receiver at medium sensitivity.

4. In a wave signal receiver having variable tuning apparatus adapted to select stations and having high amplification and sensitivity in response to a control applied thereto and low amplification and sensitivity in the absence of such control, the signal seeking apparatus operative in one mode for selecting signals of various strengths and in another mode for selecting only signals of comparatively high strength, including in combination driving means adapted to operate the tuning apparatus so that the same tunes across a frequency band, switching means including first and second individually operative sections, said second section including an additional portion releasable by operation of said first section, a control circuit responsive to a signal of predetermined level in the receiver to become inoperative, relay means having contacts to operate said driving means and to render operative said control circuit and further contacts closed in the deenergized condition thereof to apply the control to the receiver, said additional portion of said second section of said switching means being coupled across said further contacts to apply the control to the receiver, said control circuit including means for deenerigizing said relay means when said control circuit is inoperative, and said first and second switch sections having contacts coupled to said relay means for initially energizing the same so that operation of said second section of said switching means establishes a first operative mode where signals of various strengths are applied to said control circuit at the predetermined level, operation of said first section establishes a second operative mode where only signals of comparatively high strength are applied to said control circuit at the predetermined level, and deenergization of said relay means applies the control to the receiver for receiving signals as determined by said signal seeking apparatus.

5. In a wave signal receiver having variable tuning means and driving means for causing said tuning means to sweep through a frequency band, and which receiver includes tuning control means for stopping the driving means in response to reception of a signal; the combination including, operating means for the receiver including a pair of manually operable actuating members, an operating circuit for controlling the driving means including relay means having a plurality of contacts, switch means for energizing said operating circuit in response to actuation of either one of said actuating members, with energization of said operating circuit causing the driving means to drive the tuning means for tuning the receiver through the frequency band, said operating circuit being deenergized by the tuning control means in response to the reception of a signal, additional switch means selectively controlled by said actuating members, and sensitivity control means connected to said contacts of said relay means and to said additional switch means for controlling the sensitivity of the receiver in response to operation of said actuating members and said relay means so that actuation of one of said actuating members causes the tuning means to sweep through the frequency band and to stop on signals of a first level, and actuation of the other of said actuating members causes the tuning means to sweep through the frequency band and stop on signals of a second level lower than said first level.

6. In a wave signal receiver having variable tuning means and an electric motor for causing said tuning means to sweep through a frequency band, and which receiver includes tuning control means for stopping the motor in response to reception of a signal; the combination including, operating means for the receiver including a pair of slidable actuating members manually operable, an operating circuit for controlling the motor including relay means having a plurality of contacts, switch means for energizing said operating circuit in responce to actuation of either one of said actuating members, with energization of said operating circuit causing the motor to drive the tuning means for tuning the receiver through the frequency band, said operating circuit being deenergized by the tuning control means in response to the reception of a signal, additional switch means selectively controlled by said actuating members, and sensitivity control means connected to said contacts of said relay means and to said additional switch means, said control means controlling the sensitivity of the receiver in response to operation of said relay means to provide different receiver sensitivity during tuning and signal reception, said control means further controlling the receiver sensitivity in response to operation of said actuating members so that actuation of one of said actuating members causes the tuning means to sweep through the frequency band and to stop on signals above a first level, and actuation of the other of said actuating members causes the tuning means to sweep through the frequency band and stop on signals above a second level lower than said first level.

7. The combination of claim 5 wherein said additional switch means includes contacts closed by operation of one actuating member and opened by operation of the other actuating member, and a pair of contacts of said relay means are series connected with said contacts of said additional switch means and are coupled to said sensitivity control means for changing the sensitivity of the receiver when said contacts of said relay means and said switch means are closed.

8. In a signal seeking radio receiver having variable tuning means and an electric motor for causing the tuning means to scan through a frequency band, and which receiver includes a tuning control circuit with relay means to control the motor and deenergize the same upon tuning of a signal, the combination including first and second manually operable actuating members, switch means operable by said actuating members, a circuit including said switch means for energizing the relay means to initiate operation of the motor, a pair of relay contacts operable by the relay means to be closed during search tuning and opened upon tuning of a signal, a pivotally mounted member movable to a first position by operation of said first actuating member and to a second position by operation of said second actuating member, further switch means positioned to be engaged by said pivotally mounted member and to be closed in the first position thereof and to be opened in the second position thereof, a sensitivity control circuit in the receiver, said sensitivity control circuit including means establishing a first receiver gain in the non-energized condition of the relay means and having circuit portions adapted to be interconnected to provide two additional levels of receiver gain for signals applied to the tuning control circuit, and means connecting said further switch means and said relay contacts across said circuit portions to select said additional levels and thereby provide a change in search sensitivity upon operation of said actuating members.

References Cited in the file of this patent

UNITED STATES PATENTS

| | | |
|---|---|---|
| 2,506,869 | Gull | May 9, 1950 |
| 2,639,373 | Goodrich | May 19, 1953 |
| 2,731,556 | Wiley | Jan. 17, 1956 |